United States Patent [19]

Ogawa et al.

[11] Patent Number: 5,019,843
[45] Date of Patent: May 28, 1991

[54] CAMERA HAVING DATA IMPRINTING FUNCTION

[75] Inventors: Yukio Ogawa; Kiyoshi Alyfuku, both of Kanagawa, Japan

[73] Assignee: Canon Kabushiki Kaisha, Tokyo, Japan

[21] Appl. No.: 562,408

[22] Filed: Jul. 31, 1990

Related U.S. Application Data

[63] Continuation of Ser. No. 427,907, Oct. 24, 1989, abandoned, which is a continuation of Ser. No. 356,663, May 22, 1989, abandoned, which is a continuation of Ser. No. 194,182, May 16, 1988, abandoned.

[30] Foreign Application Priority Data

May 18, 1987 [JP] Japan .................. 62-118782

[51] Int. Cl.⁵ ............................. G03B 17/24
[52] U.S. Cl. ..................................... 354/106
[58] Field of Search ......................... 354/106

[56] References Cited

U.S. PATENT DOCUMENTS 4,470,677 9/1984 Tsujimoto et al. ................ 354/106
4,515,452 5/1985 Tsuzuki .............................. 354/106

Primary Examiner—Michael L. Gellner
Attorney, Agent, or Firm—Fitzpatrick, Cella, Harper & Scinto

[57] ABSTRACT

A camera has a data imprinting function provided with transport means for transporting photosensitive means, data imprinting means for imprinting data on a frame of the photosensitive means during transportation by the transport means after that frame of the photosensitive means has been exposed, reader means for reading the regular maximum number of exposure frames from a code provided on the photosensitive means, counter means for counting the number of exposed frames of the photosensitive means, and restricting means for restricting, on the basis of the regular maximum number of exposure frames read out by the reader means and the counted content of the counter means, restricting the imprinting data on the photosensitive means during transportation beyond either the last frame or the last frame but one of the regular maximum number of exposure frames.

56 Claims, 5 Drawing Sheets

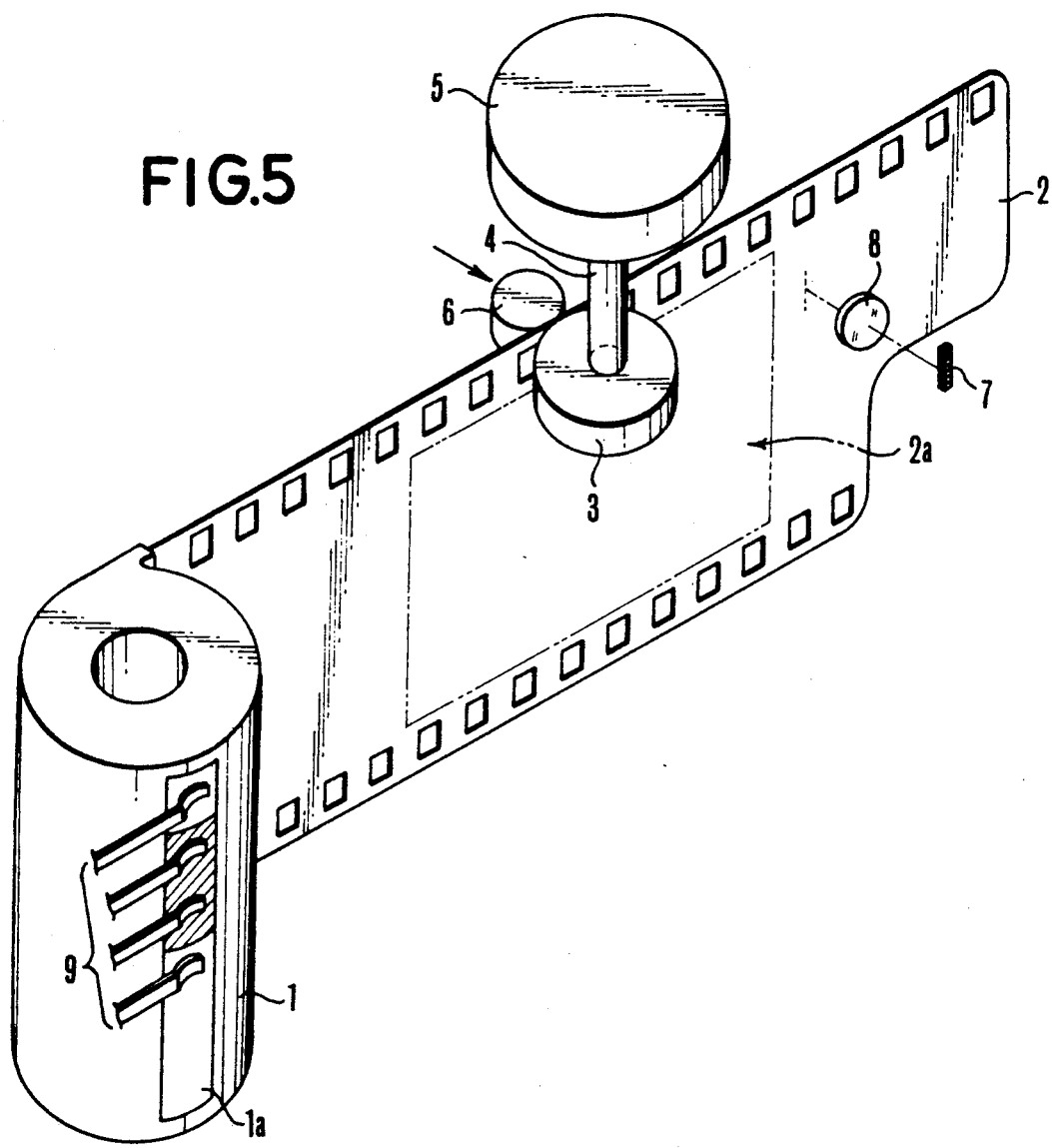

CAMERA HAVING DATA IMPRINTING FUNCTION

This application is a continuation of application Ser. No. 427,907, filed on Oct. 24, 1989, which is a continuation of application Ser. No. 356,663, filed on May 22, 1989, which is a continuation of application Ser. No. 194,182, filed on May 16, 1988, all abandoned.

BACKGROUND OF THE INVENTION

1. Field of the Invention

This invention relates to cameras of the type in which during the transportation of film serving as a photosensitive means that follows the exposure, data is imprinted on that exposed frame of the film and, more particularly, to improvements of the data imprinting function.

2. Description of the Related Art

Many proposals have been made concerning the cameras of the type in which a plurality of LEDs in a row perpendicular to the path of transportation of the film are arranged to be selectively energized to imprint data such as year, month and day on the film surface in dot-matrix form. Since, in such cameras, the above-described operation of the LEDs is started at a time during the winding-up operation that follows the termination of each exposure, and continues for the rest of the winding-up operation, until the last exposed frame is wound up, it has often happened that the film is stretched in the middle of a winding-up operation with the result that the imprinting of all data on the last exposed frame is left not perfectly performed (or fails to carry out to the complete end). Because the camera, though under such a condition, is automatically switched to the rewind mode, there has been a drawback that the photograph taken with the last frame will be found to be unacceptable due to the only partly imprinted data.

SUMMARY OF THE INVENTION

With the foregoing in mind, it is an object of the invention to provide a camera having a data imprinting function capable of preventing occurrence of the event that the data to be recorded on the photosensitive means is partly imprinted which later makes unacceptable the photograph taken therewith.

To achieve this, the camera includes transport means for transporting photosensitive means past an exposure aperture, data imprinting means for imprinting data on a frame of the photosensitive means after that frame has been exposed and during the time when the photosensitive means is transported by the transport means, read means for reading the regular maximum number of exposure frames of the photosensitive means from a code provided on the photosensitive means, count means for counting the number of exposed frames of the photosensitive means, and restricting means for restricting, on the basis of the predetermined maximum number of exposure frames read out by the read means and the counted content of the count means, the imprinting of data on the photosensitive means beyond either the last frame or the last frame but one of the maximum number of exposure frames.

This and other objects of the invention will become apparent from the following description of preferred embodiments thereof.

BRIEF DESCRIPTION OF THE DRAWINGS

FIG. 5 is a perspective view of the main parts of a data imprinting mechanism and a film position detecting mechanism used in all the embodiments shown in FIGS. 1 to 4.

DETAILED DESCRIPTION OF THE PREFERRED EMBODIMENTS

Figure 1:
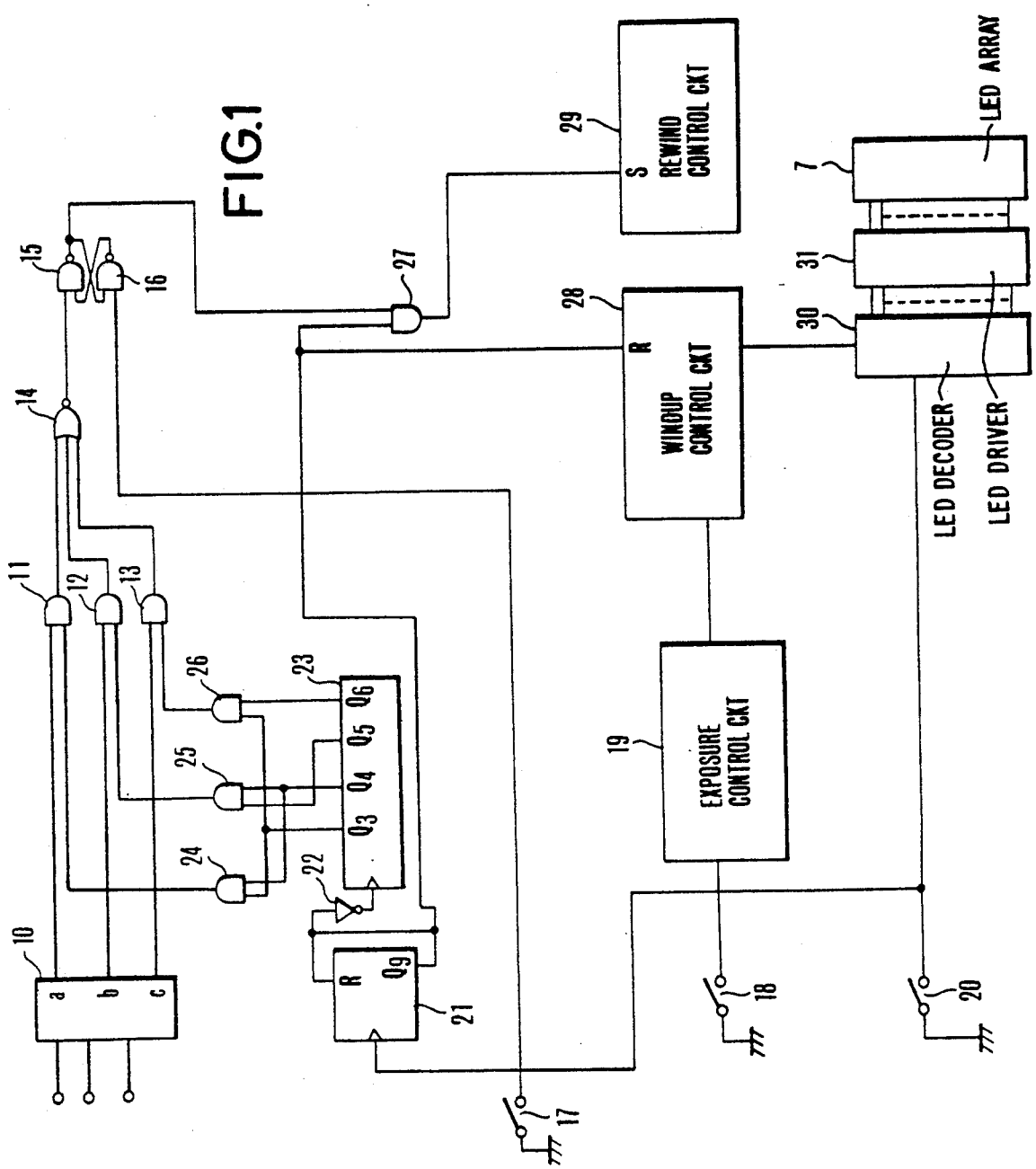
FIG. 1 is an electrical circuit diagram of a first embodiment of the invention.

The invention is next described in connection with embodiments thereof by reference to the drawings.

In FIG. 5, the data imprinting mechanism and film position detecting mechanism which are applied to each of the embodiments of FIG. 1 to FIG. 4 are shown along with a film cartridge 1 containing film 2 serving as the photosensitive means. What number of exposure frames are available at maximum is recorded on the side wall of the cartridge 1 in the form of a DX code 1a. The film 2 is transported past an exposure aperture 2a by a film transport roller 3 which is fixedly secured through a shaft 4 to an encoder 5. A film presser roller 6 is arranged in an opposite position of the roller 3 and is urged by a spring (not shown) to a direction indicated by arrow to press the film 2 against the roller 3. The data imprinting mechanism includes, for example, an LED array 7 arranged in a space between the exposure aperture 2a and a takeup spool chamber (not shown) to be driven each time the film 2 runs each frame as it is wound up, and an image-forming lens 8 for focusing the light from the LED array 7 on the film 2 to imprint data in dot-matrix form. The reader for reading the regular maximum number of exposure frames has a probe 9 arranged to contact the DX code 1a of the cartridge 1 when loaded in a chamber therefor.

In FIG. 1, there is shown a first embodiment of the invention. The circuit includes a decoder 10 receptive of information from the DX code reader probe 9 shown in FIG. 5 for producing an output in binary coded form, depending on the regular maximum number of exposure frames of the film 2, in such a way that when the 36-exposure cartridge is in use, the output takes H level (which stands for the signal of high level) at a first terminal a; for the 24-exposure cartridge, at a second terminal b; for the 12-exposure cartridge, at a third terminal c, 2-input AND gates 11, 12 and 13, and a NOR gate 14. Two NAND gates 15 and 16 constitute a latch circuit responsive to opening of a back cover of the camera, or closure of a detector switch 17 for the back cover, that is, responsive to initiation of a film loading operation, for producing an output of L level (which stands for a signal of low level). 18 is a release switch cooperating with the publicly known exposure control circuit 19. The circuit further includes a switch 20 arranged upon rotation of the encoder 5 of FIG. 5 to turn on and off, for example, 256 times during the time when the film advances one frame, a counter 21 for counting cycles of the on-off operation of the switch 20 upon attainment of the counted number to "256", in other words, upon completion of each cycle of film winding-up operation, for changing its Q output to H level, a film frame counter 23 for counting pulses from the counter 21 through an inverter 22, three AND gates 24, 25 and 26 constituting a decoder responsive to attainment of the content of the frame counter 23 to "36", "24" or "12" for changing the output of the AND gate 26, 25 or 24 to H level respectively, and another 2-input AND gate 27. 28 is the publicly known windup control circuit. 29 is the publicly known control circuit. As long as the windup control circuit 28 is producing a signal representing that the winding-up operation is in progress, an LED decoder 30 in cooperation with an LED driver 31 controls the driving (the switching between energization and deenergization) of the LED array 7 in synchronism with the on-off signal representing the relative position of the latest exposed frame of film to the LED array 7 from the switch 20.

In operating the circuit of such construction, when the release button is pushed down, the release switch 18 turns on, so that the exposure control circuit 19 is actuated to expose that frame of film which is in the aperture 2a to an object image. At the termination of the exposure, that circuit 19 produces an output of H level, which is applied to the windup control circuit 28, thus initiating a winding-up operation of the film 2. As the film 2 is advancing, the encoder 5 rotates, causing the switch 20 to turn on and off repeatedly. In synchronism with this signal, the LED decoder 30 and the LED driver 31 (since, at this time, the windup control circuit 28 gives the signal representing that the winding-up operation is in progress to the LED decoder 30, the LED decoder 30 and the LED driver 31 are being excited) actuate the LED array 7 for imprinting data such as year, month and day in dot matrix on the running film surface by the publicly known method. Meanwhile, the number of times the switch 20 has turned on is counted by the counter 21. When the counted content reaches "256", or when the film 2 has advanced one frame, the Q output of the counter 21 changes to H level, resetting the windup control circuit 28. Thus, the film winding operation terminates. Along with this, the content of the frame counter 23 is incremented one. For instance, when the first frame has been exposed and wound up, it is renewed to "2". It should be noted that the counter 21 resets itself when its Q output changes to H level, because this output is applied to its own "reset" terminal.

Such a procedure is repeated until the last of the regular maximum number of exposure frames (for example, 36th frame) is used up. After the exposure has been completed, the winding up of the film 2 is executed. When the Q output of the counter 21 becomes H level, the winding-up operation stops as has been described above. Also, since at this time the counted content of the frame counter 23 already reaches "36", because the output of the AND gate 26 constituting part of the decoder is of H level, and because, in this case, the output at the terminal c of the DX decoder 10 has been H level, the AND gate 13 changes its output to H level, which in turn causes the output of the NOR gate 14 to change to low level. Therefore, the output of the latch circuit comprised of the NAND gates 15 and 16 inverts to H level. Therefore, by the change of the Q output of the counter 21 to H level, the film 2 is stopped from the winding and at the same time the output of the AND gate 27 becomes H level, actuating the rewind control circuit 29 to start a film winding operation.

In the embodiment of FIG. 1, on the assumption that the film in the cartridge has usually a larger capacity than the regular maximum number of exposure frames by one or two frames, it is after all the prescribed number of exposure frames, in this instance, 36 frames, have been exposed that one more frame is wound up, before the rewinding operation starts. Hence, it is made possible to assure that data can be imprinted up to the last or 36th frame without failure. Thus, it never happens that an unacceptable photograph is taken from the 37th or higher frame which would otherwise be imperfectly imprinted with data.

Figure 2:
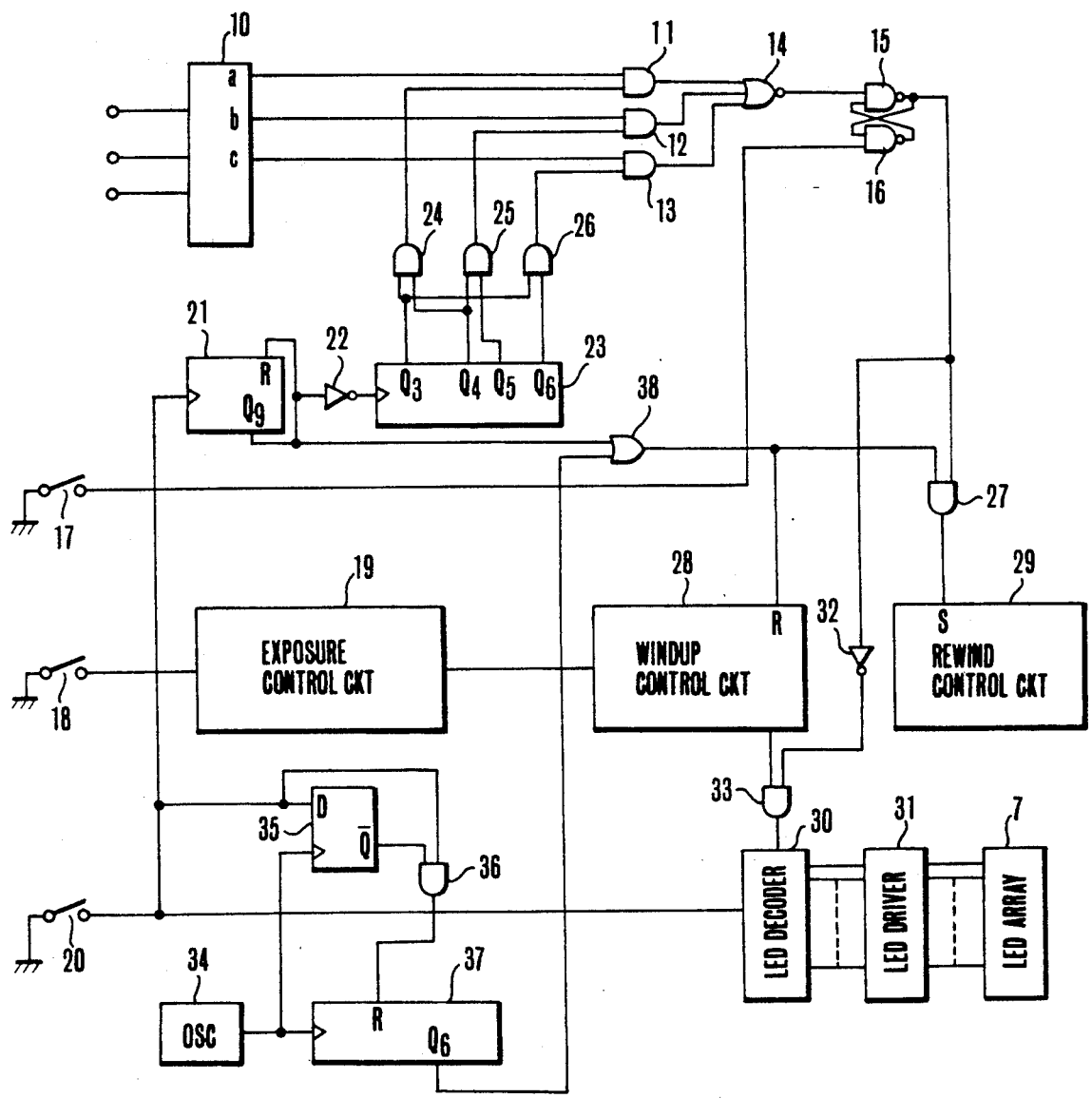
FIG. 2 is an electrical circuit diagram of a second embodiment of the invention.

In FIG. 2 there is shown a second embodiment of the invention where the like parts to those shown in FIG. 1 are denoted by the same reference numerals and no more explained. The output of the latch circuit comprised of NAND gates 15 and 16 is connected to the input of an inverter 32 whose output is connected to one of the two inputs of an AND gate 33, the other input of which is connected to the windup control circuit 28. 34 is the publicly known clock pulse generating circuit. A D type flip-flop 35 constitutes a one-shot circuit together with an AND gate 36. Each time the switch 20 turns on, the one-shot circuit produces one pulse which is applied to a counter 37 for detecting when the film is stretched. If the counter 37 is not reset in a predetermined time determined by the pulse, its Q output becomes H level. An OR gate 38 has two inputs connected to the outputs of the counters 21 and 37.

In this embodiment, for the 36-exposure cartridge, though, as has been described above, a somewhat larger number of, say, 37 or 38, frames are actually available, it is stipulated here that the maximum possible number of exposed frames is made equalized to the regular maximum number of exposure frames. For this purpose, on recognizing that the presently exposed frame is the 36th one, when winding up the 36th frame, the actuating signal (representing the winding-on) from the windup control circuit 28 is prohibited from being applied to the LED decoder 30. Hence, from the start, the imprinting of data onto the 36th frame is not carried out so as not to result in the interruption of the imprinting operation.

This feature is explained in more detail by using FIG. 2. When the counted content of the counter 23 reaches the regular maximum number of exposure frames i.e. "36", the output of the latch circuit comprised of NAND gates 15 and 16 becomes H level. Thereby the output of the inverter 32 is changed to L level, and, therefore, the output of the AND gate 33 also is changed to L level. Even if the windup control circuit 28 later produces the output signal representing the winding-on, therefore, the LED decoder 30 is not actuated. Hence the LED array 7 is prohibited from being driven. Thus, imprinting of data onto the 36th frame does not take place and no unacceptable photograph will be printed from the thus-treated 36th frame. Another feature is that on the assumption that the film is stretched at a time during the winding-up operation of the 36th frame, then the timer or counter 37 is not reset. When its output changes to H level, the output of the OR gate 38 also changes to H level, causing the winding up operation of the film 2 to interrupt. At the same time, the rewind control circuit 29 is actuated, thus initiating a film rewinding operation.

Figure 3:
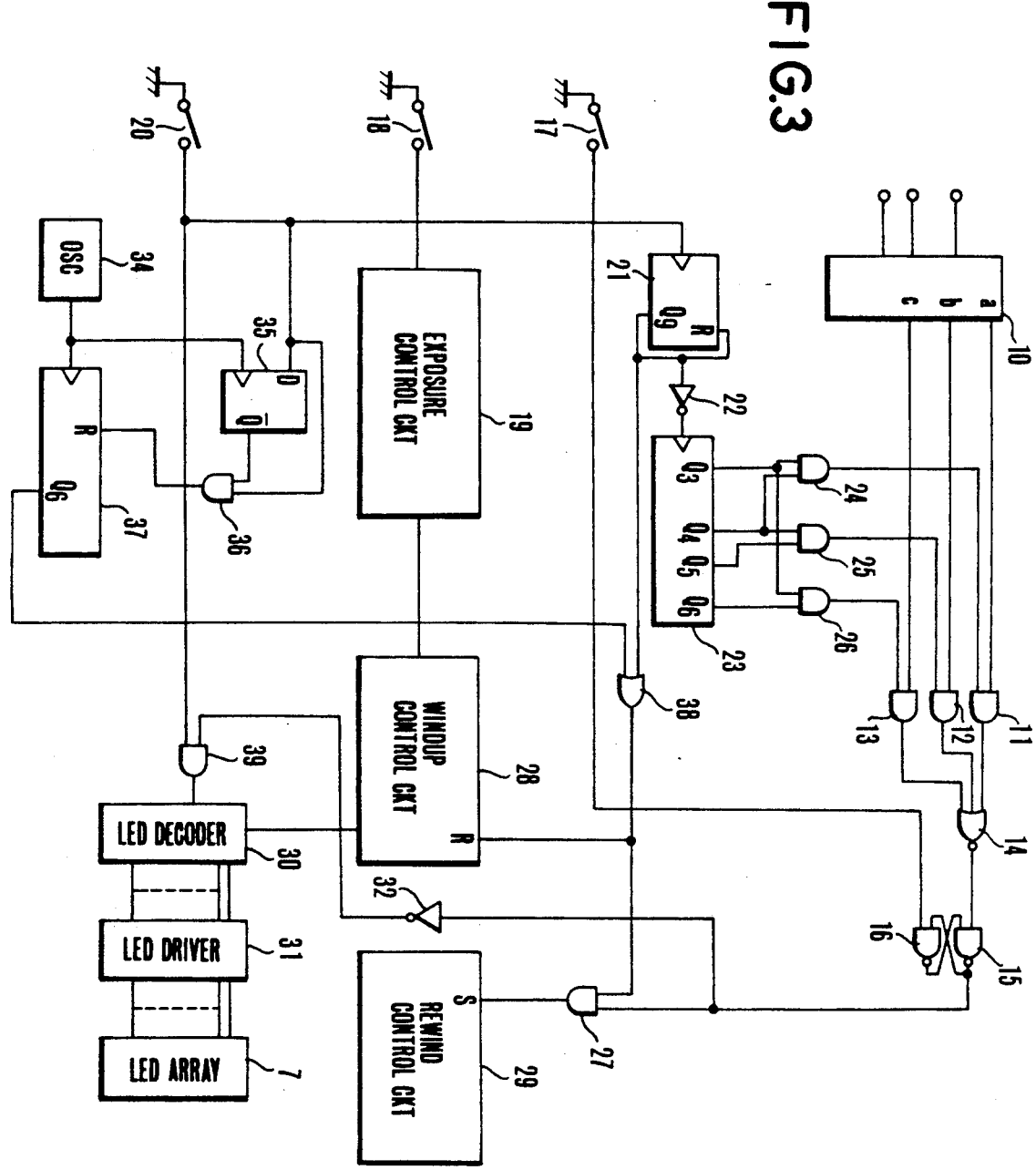
FIG. 3 is an electrical circuit diagram of a third embodiment of the invention.

FIG. 3 shows a third embodiment of the invention which is almost similar to the FIG. 2 embodiment, but different therefrom in that use is made of a 2-input AND gate 39 arranged to receive the signals from the inverter 32 and the switch 20. With this, the excitation of the LED decoder 30 is not prohibited as in the FIG. 2 embodiment, but the application of the on-off signal from the switch 20 to the LED decoder 30 starts to be prohibited when the number of exposed frames reaches a value equal to the regular maximum number of exposure frames. Hence, from the beginning, the imprinting of data onto the last exposed frame, i.e. 36th one, is not carried out to prevent the imprinting operation from interrupting. Thus, the possibility of taking unacceptable photographs is reduced to zero. It should be noted that the other features of the FIG. 3 embodiment are similar to those of the FIG. 2 embodiment and, therefore, no more explained here.

Figure 4:
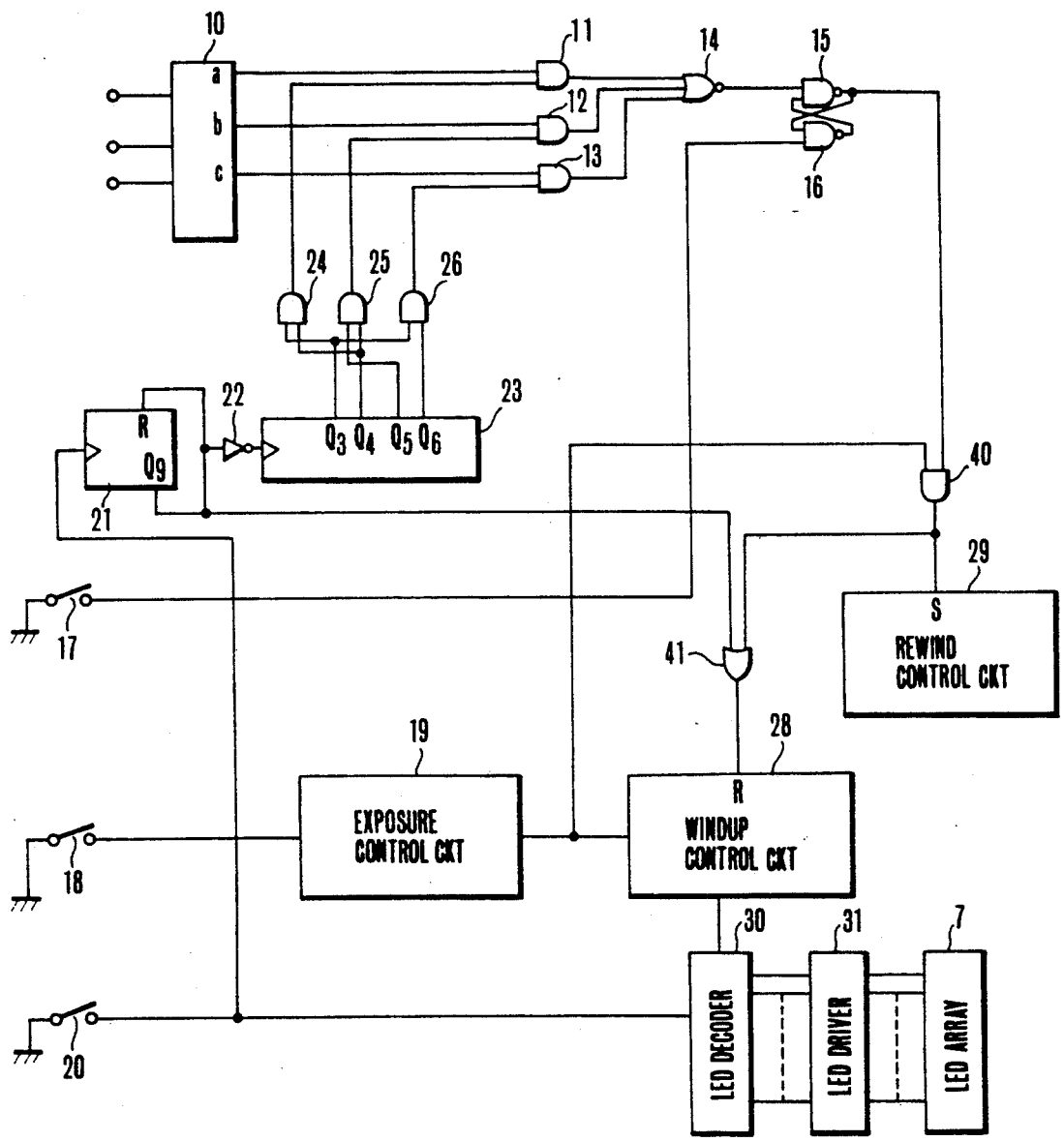
FIG. 4 is an electrical circuit diagram of a fourth embodiment of the invention.

FIG. 4 shows a fourth embodiment of the invention where an identical result to that of the above-described FIG. 2 or FIG. 3 embodiment, that is, on the assumption that no more frame than the regular maximum number of exposure frames is available, the last frame, i.e. 36th one, is not prohibited from being imprinted with data therefor, is effected in another way.

This feature is briefly explained by using FIG. 4. When the exposure operation of the last or 36th frame is completed, the exposure control circuit 19 produces an output of H level. But, since at this time the counter 23 has already counted an equal number, say 36, to the regular maximum number of exposure frames, because the output of the latch circuit comprised of NAND gates 15 and 16 has become H level, the output of an AND gate 40 changes to H level to actuate the rewind control circuit 29. Thus, an initiation of the film rewinding operation immediately follows. Also, since at this time an OR gate 41 routes it to the windup control circuit 28, the latter is also reset so that the LED decoder 30 is prohibited from being excited. It should be noted that the other features of the FIG. 4 embodiment are similar to those of the FIG. 1 embodiment and need not be explained here.

Though in the FIG. 4 embodiment even if the used cartridge provides a somewhat larger number of frames than the regular maximum one, the exposed film is rewound when the regular maximum number of exposure frames has all been used up, modification may be made. Upon consideration of occasions that one or two more frame or frames are available, the camera may otherwise be switched to the rewind mode after the film stretching is detected. In doing so, the film can be used advantageously. Of course, for this case, the imprinting of data onto the last one of the regular maximum number of exposure frames and those that follow is not carried out.

Also, though in the above-described embodiments the LED array 7 and associated parts as the data imprinting means are positioned away from the aperture 2a to the takeup spool side, this means may otherwise be positioned inside the aperture 2a (in this case, the data are imprinted from the back of the film). Also, the longitudinal length of the area into which the data are to be imprinted is far shorter than the length of one frame. On this account, in the FIG. 1 embodiment, though the surplus winding of the film after the regular maximum number of exposure frames has been made long enough to advance the film through the entire length of one frame, the surplus movement of the film may be shortened to a value equal to the width of the data imprinted area. The invention is applicable to any other types of cameras using other photosensitive materials than photographic film.

What is claimed is:
1. A camera comprising:

(A) transport means for transporting photosensitive means;
(B) data imprinting means for imprinting data on a frame of said photosensitive means during transportation by said transport means after that frame of said photosensitive means has been exposed;
(C) reader means for reading a regular maximum number of exposure frames of said photosensitive means from a code provided on said photosensitive means;
(D) counter means for counting the number of exposed frames of said photosensitive means; and
(E) restricting means for restricting, on the basis of the regular maximum number of exposure frames read out by said reader means and the counted content of said counter means, the imprinting of data on said photosensitive means during transportation beyond either the last frame or the las frame but one of said regular maximum number of exposure frames.

2. A camera comprising:
(A) data imprinting means for imprinting data on photosensitive means,
(B) detection means for detecting the number of photographable frames of said photosensitive means, and
(C) restricting means for restricting the imprinting of said data imprinting means beyond a prescribed frame of said photosensitive means in response to the detection means.

3. A camera according to claim 2, wherein said data imprinting means comprises means for forming the imprinted data with dots.

4. A camera according to claim 3, wherein said transport imprinting means comprises means for performing the data imprinting during the transportation of one frame of said photosensitive means.

5. A camera according to claim 3, wherein said transport imprinting means comprises means for performing the data imprinting during the transportation of one frame of said photosensitive.

6. A camera according to claim 3, wherein said transport imprinting means comprises means for performing the data imprinting during winding-up of one frame of said photosensitive means.

7. A camera according to claim 6, wherein said photosensitive means comprises a photographic film.

8. A camera according to claim 6, further comprising feed means for feeding the photosensitive means to cause said data imprinting means to act on said photosensitive means and thereafter automatically rewinding said photosensitive means after completion of photographing of said prescribed frame of said photosensitive means.

9. A camera according to claim 6, further comprising feed means for feeding the photosensitive means to cause said data imprinting means to act on said photosensitive means after completion of photographing of said prescribed frame of said photosensitive means.

10. A camera according to claim 3, further comprising feed means for feeding the photosensitive means to cause said data imprinting means to act on said photosensitive means and thereafter automatically rewinding said photosensitive means after completion of photographing of said prescribed frame of said photosensitive means.

11. A camera according to claim 3, further comprising feed means for feeding the photosensitive means to cause said data imprinting means to act on said photosensitive means after completion of photographing of said prescribed frame of said photosensitive means.

12. A camera according to claim 2, wherein said detection means including read means for reading the number of the photographable frames of said photosensitive means from a code provided on a cartridge housing containing said photosensitive means.

13. A camera according to claim 2, wherein said restriction means includes means for permitting the data imprinting of said data imprinting means up to the last frame of the photographable frames of said photosensitive means or up to the last frame but one of the same.

14. A camera according to claim 13, wherein said data imprinting means includes response means for performing the data imprinting after the exposure of said photosensitive means.

15. A camera according to claim 2, wherein said restricting means includes count means for counting the number of photographed frames.

16. A camera according to claim 2, further comprising feed means for feeding the photosensitive means to cause said data imprinting means to act on said photosensitive means and thereafter automatically rewinding said photosensitive means after completion of photographing of said prescribed frame of said photosensitive means.

17. A camera according to claim 2, further comprising feed means for feeding the photosensitive means to cause said data imprinting means to act on said photosensitive means after completion of photographing of said prescribed frame of said photosensitive means.

18. A data imprinting device comprising:
(A) data imprinting means for imprinting data on photosensitive means,
(B) detection means for detecting the number of photographable frames of said photosensitive means, and
(C) restricting means for restricting the imprinting of said data imprinting means beyond a prescribed frame of said photosensitive means in response to the detection means.

19. A data imprinting device according to claim 18, wherein said data imprinting means comprises transport imprinting means for imprinting data on said photosensitive means during the transportation of the same.

20. A data imprinting device according to claim 19, wherein said transport imprinting means comprises means for forming the imprinted data with dots.

21. A data imprinting device according to claim 19, wherein said transport imprinting means comprises means for performing the data imprinting during the transportation of one frame of said photosensitive means.

22. A data imprinting device according to claim 19, wherein said transport imprinting means comprises means for performing the data imprinting during winding-up of one frame of said photosensitive means.

23. A data imprinting device according to claim 22, wherein said photosensitive means comprises a photographic film.

24. A device according to claim 22, further comprising feed means for feeding the photosensitive means to cause said data imprinting means to act on said photosensitive means and thereafter automatically rewinding said photosensitive means after completion of photographing of said prescribed frame of said photosensitive means.

25. A device according to claim 22, further comprising feed means for feeding the photosensitive means to cause said data imprinting means to act on said photosensitive means after completion of photographing of said prescribed frame of said photosensitive means.

26. A device according to claim 22, further comprising feed means for feeding the photosensitive means to cause said data imprinting means to act on said photosensitive means and thereafter automatically rewinding said photosensitive means after completion of photographing of said prescribed frame of said photosensitive means.

27. A device according to claim 22, further comprising feed means for feeding the photosensitive means to cause said data imprinting means to act on said photosensitive means after completion of photographing of said prescribed frame of said photosensitive means.

28. A data imprinting device according to claim 18, wherein said detection means includes read means for reading the number of the photographable frames of said photosensitive means from a code provided on a cartridge housing containing said photosensitive means.

29. A data imprinting device according to claim 18, wherein said restriction means includes means for permitting the data imprinting of said data imprinting means up to the last frame of the photographic frames of said photosensitive means or up to the last frame but one of the same.

30. A data imprinting device according to claim 29, wherein said data imprinting means includes response means for performing the data imprinting after the exposure of said photosensitive means.

31. A data imprinting device according to claim 18, wherein said restricting means includes count means for counting the number of photographed frames.

32. A device according to claim 18, further comprising feed means for feeding the photosensitive means to cause said data imprinting means to act on said photosensitive means and thereafter automatically rewinding said photosensitive means after completion of photographing of said prescribed frame of said photosensitive means.

33. A device according to claim 18, further comprising feed means for feeding the photosensitive means to cause said data imprinting means to act on said photosensitive means after completion of photographing of said prescribed frame of said photosensitive means.

34. A data imprinting device comprising:
(A) transport means for transporting photosensitive means;
(B) data imprinting means for imprinting data on a frame of said photosensitive means during transportation by said transport means after that frame of said photosensitive means has been exposed;
(C) reader means for reading a regular maximum number of exposure frames of said photosensitive means from a code provided on said photosensitive means;
(D) counter means for counting the number of exposed frames of said photosensitive means; and
(E) restricting means for restricting, on the basis of the regular maximum number of exposure frames read out by said reader means and the counted content of said counter means, the imprinting of data on said photosensitive means during transportation beyond either the last frame or the last frame but one of said regular maximum number of exposure frames.

35. A camera comprising:

(A) data recording means for recording data which is different from an image on photosensitive means;

(B) detection means for detecting the number of recordable frames of said photosensitive means; and (C) restricting means for restricting the recording of said data recording means beyond a prescribed frame of said image recording means in response to the detection means.

36. A camera according to claim 35, wherein said data imprinting means comprises transport imprinting means for imprinting data on said photosensitive means during the transportation of the same.

37. A camera according to claim 36, wherein said transport imprinting means comprises means for forming the imprinted data with dots.

38. A camera according to claim 36, wherein said transport imprinting means comprises means for performing the data imprinting during the transportation of one frame of said photosensitive means.

39. A camera according to claim 36, wherein said transport imprinting means comprises means for performing the data imprinting during winding-up of one frame of said photosensitive means.

40. A camera according to claim 36, wherein said photosensitive means comprises a photographic film.

41. A camera according to claim 36, wherein said restriction means includes means for permitting the data imprinting of said data imprinting means up to the last frame of the photographable frames of said photosensitive means or up to the last frame but one of the same.

42. A camera according to claim 41, wherein said data imprinting means includes response means for performing the data imprinting after the exposure of said photosensitive means.

43. A camera according to claim 35, wherein said restricting means includes count means for counting the number of photographed frames.

44. A camera according to claim 35, wherein said detection means includes read means for reading a regular number of image recording frames of said photosensitive means from a code provided with said photosensitive means.

45. A camera according to claim 35, further comprises feed means for feeding the image recording means to cause said data recording means to act on said image recording means after completion of recording of said prescribed frame of said photosensitive means.

46. A data recording device comprising:

(A) data recording means for recording data which is different from an image on photosensitive means;

(B) detection means for detecting the number of recordable frames of said photosensitive means; and (C) restricting means for restricting the recording of said data recording means beyond a prescribed frame of said image recording means in response to the detection means.

47. A data recording device according to claim 46, wherein said data imprinting means comprises transport imprinting means for imprinting data on said photosensitive means during the transportation of the same.

48. A data recording device according to claim 47, wherein said transport imprinting means comprises means for forming the imprinted data with dots.

49. A data recording device according to claim 47, wherein said transport imprinting means comprises means for performing the data imprinting during the transportation of one frame of said photosensitive means.

50. A data recording device according to claim 47, wherein said transport imprinting means comprises means for performing the data imprinting during winding-up of one frame of said photosensitive means.

51. A data recording device according to claim 50, wherein said photosensitive means comprises a photographic film.

52. A data recording device according to claim 47, wherein said restriction means includes means for permitting the data imprinting of said data imprinting means up to the last frame of the photographic frames of said photosensitive means or up to the last frame but one of the same.

53. A data recording device according to claim 52, wherein said data imprinting means includes response means for performing the data imprinting after the exposure of said photosensitive means.

54. A data recording device according to claim 46, wherein said restricting means includes count means for counting the number of photographed frames.

55. A data recording device according to claim 46, wherein said detection means includes read means for reading a regular number of image recording frames of said photosensitive means from a code provided with said photosensitive means.

56. A data recording device according to claim 46, further comprises feed means for feeding the image recording means to cause said data recording means to act on said image recording means after completion of recording of said prescribed frame of said photosensitive means.

* * * * *

UNITED STATES PATENT AND TRADEMARK OFFICE
CERTIFICATE OF CORRECTION

PATENT NO. : 5,019,843

DATED : May 28, 1991

INVENTOR(S) : YUKIO OGAWA, ET AL.

It is certified that error appears in the above-identified patent and that said Letters Patent is hereby corrected as shown below:

COLUMN 6:

Line 18, "las" should read --last--;
Line 32, "means for forming the im-" should read --transport imprinting means for imprinting data on said photosensitive means during the transportation of the same.--;
Line 33, "printed data with dots." should be deleted;
Line 35, "performing" should read --forming the imprinted data with dots.--;
Line 36, "the data imprinting during the transportation of one" should be deleted;
Line 37, "frame of said photosensitive means." should be deleted; and
Line 41, "photosensitive." should read --photosensitive means.--.

COLUMN 7:

Line 5, "including read means" should be deleted;
Line 7, "on a cartridge hous-" should read --with--; and
Line 8, "ing containing" should be deleted.

COLUMN 8:

Line 21, "on a" should read --with--;
Line 22, "cartridge housing containing" should be deleted; and
Line 26, "photographic" should read --photographable--.

UNITED STATES PATENT AND TRADEMARK OFFICE
CERTIFICATE OF CORRECTION

PATENT NO. : 5,019,843  Page 2 of 4
DATED : May 28, 1991
INVENTOR(S) : YUKIO OGAWA, ET AL.

It is certified that error appears in the above-identified patent and that said Letters Patent is hereby corrected as shown below:

COLUMN 9:

Line 3, "photosensitive" should read --an image recording--;
Line 5, "photosensitive" should read --an image recording--;
Line 12, "imprinting" should read --recording-- (both occurrences);
Line 13, "imprinting" should read --recording--

Line 16, "imprinting" should read --recording--;
Line 17, "imprinted" should read --recorded--;
Line 19, "imprinting" should read --recording--;
Line 20, "imprinting" should read --recording--;
Line 21, "photosensitive" should read --image recording--;
Line 23, "imprinting" should read --recording--;
Line 24, "imprinting" should read --recording--;
Line 25, "photosensitive" should read --image recording--;
Line 26, "claim 36," should read --claim 39,--;
Line 27, "photosensitive" should read --image recording--;
Line 28, "claim 36," should read --claim 35,--;
Line 30, "imprinting" should read --recording-- (both occurrences);
Line 31, "photographable" should read --recordable--, and "photosensi-" should read --image recording--;
Line 32, "tive" should be deleted;
Line 35, "imprinting" should read --recording--;
Line 36, "imprinting" should read --recording--;
Line 37, "photosensitive" should read --image recording--;
Line 40, "photographed" should read --recorded--;
Line 43, "photosen-" should read --image recording--;
Line 44, "sitive" should be deleted, and "photosensi-" should read --image recording--;
Line 45, "tive" should be deleted; and
Line 51, "photosensitive" should read --image recording--.

UNITED STATES PATENT AND TRADEMARK OFFICE
CERTIFICATE OF CORRECTION

| | |
|---|---|
| PATENT NO. : 5,019,843 | Page 3 of 4 |
| DATED : May 28, 1991 | |
| INVENTOR(S) : YUKIO OGAWA, ET AL. | |

It is certified that error appears in the above-identified patent and that said Letters Patent is hereby corrected as shown below:

COLUMN 10:

Line 2, "photosensitive" should read --image recording--;
    Line 4, "photosensitive" should read --image recording--;
    Line 10, "imprinting" should read --recording--;
    Line 11, "imprinting" should read --recording-- (both occurrences), and "photosen-" should read --image recording--;
    Line 12, "sitive" should be deleted;
    Line 14, "imprinting" should read --recording--;
    Line 15, "imprinted" should read --recorded--;
    Line 17, "imprinting" should read --recording--;
    Line 18, "imprinting" should read --recording--;
    Line 19, "photosensitive" should read --image recording--;
    Line 22, "imprinting" should read --recording--;
    Line 23, "imprinting" should read --recording--;
    Line 24, "photosensitive" should read --image recording--;
    Line 26, "photosensitive" should read --image recording--;
    Line 30, "imprinting" should read --recording-- (both occurrences);
    Line 31, "photographable" should read --recordable--;
    Line 32, "photosensitive" should read --image recording--;
    Line 35, "imprinting" should read --recording--;
    Line 36, "imprinting" should read --recording--;
    Line 37, "photosensitive" should read --image recording--;
    Line 40, "photographed" should read --recorded--;
    Line 44, "photosensitive" should read --image recording--;

UNITED STATES PATENT AND TRADEMARK OFFICE
CERTIFICATE OF CORRECTION

PATENT NO. : 5,019,843

DATED : May 28, 1991

INVENTOR(S) : YUKIO OGAWA, ET AL.

It is certified that error appears in the above-identified patent and that said Letters Patent is hereby corrected as shown below:

COLUMN 10

Line 45, "photosensitive" should read --image recording--;
    Line 47, "the" should read --said--;
    Line 50, "photosensi-" should read --image recording--; and
    Line 51, "tive" should be deleted.

Signed and Sealed this

Fourth Day of May, 1993

Attest:

MICHAEL K. KIRK

Attesting Officer      Acting Commissioner of Patents and Trademarks